United States Patent [19]

Kasugai et al.

[11] Patent Number: 4,815,705
[45] Date of Patent: Mar. 28, 1989

[54] VALVE BODY

[75] Inventors: Joji Kasugai, Ichinomiya; Satoshi Toki, Inazawa; Koji Enomoto, Handa; Takamasa Suzuki, Konan, all of Japan

[73] Assignee: Toyoda Gosei Co., Ltd., Nishikasugai, Japan

[21] Appl. No.: 116,083

[22] Filed: Nov. 3, 1987

[30] Foreign Application Priority Data

Nov. 27, 1986 [JP] Japan ............................ 61-282640
Dec. 28, 1986 [JP] Japan ........................ 61-201026[U]

[51] Int. Cl.$^4$ .................................................. B65D 51/16
[52] U.S. Cl. ..................................... 251/356; 137/854; 220/203
[58] Field of Search ......................... 251/356; 137/854; 220/203

[56] References Cited

U.S. PATENT DOCUMENTS

| | | | |
|---|---|---|---|
| 2,542,254 | 2/1951 | Lamb | 137/854 |
| 3,085,591 | 4/1963 | Schneider | 137/854 |
| 3,331,390 | 7/1967 | Hoffman | 137/854 |
| 4,540,103 | 9/1985 | Kasugai et al. | 220/203 |
| 4,572,396 | 2/1986 | Kasugai et al. | 220/203 |
| 4,588,102 | 5/1986 | Kasugai | 220/203 |
| 4,666,056 | 5/1987 | Kasugai et al. | 220/203 |
| 4,724,868 | 2/1988 | Kasugai et al. | 251/284 |
| 4,726,488 | 2/1988 | Kasugai | 137/493.9 |

FOREIGN PATENT DOCUMENTS 2042689 9/1980 United Kingdom ............... 137/854

Primary Examiner—A. Michael Chambers
Attorney, Agent, or Firm—Cushman, Darby & Cushman

[57] ABSTRACT

A valve body made of a rubbery elastic material comprising a securing portion which is held by a securing member, and a lip portion which extends from the securing portion and which abuts against a portion to be sealed, which portion to be sealed opposes the securing member.

The valve body has an annular recess formed in the base of the lip portion on the side which faces the securing portion or on the side which is opposite to a tip portion thereof. The valve body is so constituted that the gap which starts from the securing portion to the edge of the lip portion is formed on the reverse side of the lip portion when the annular recess is disposed around the lip portion on the side facing the securing portion.

6 Claims, 8 Drawing Sheets

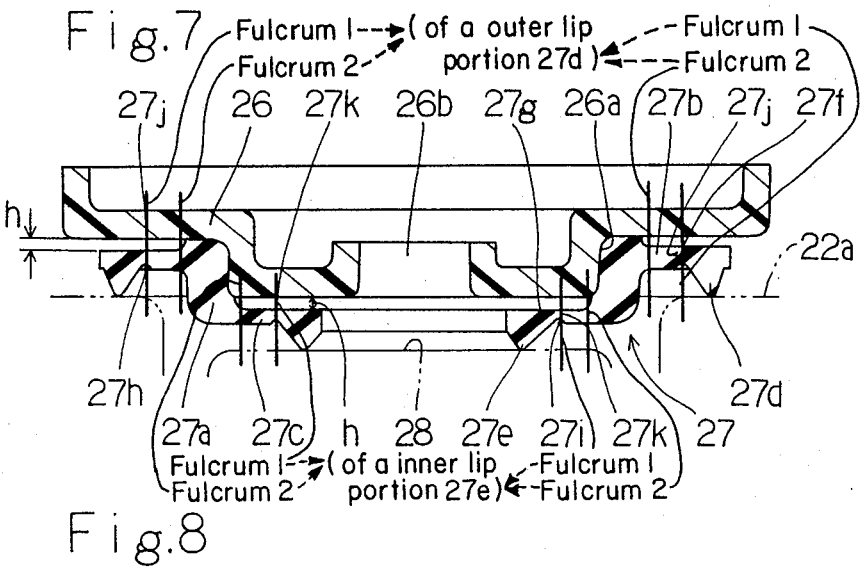
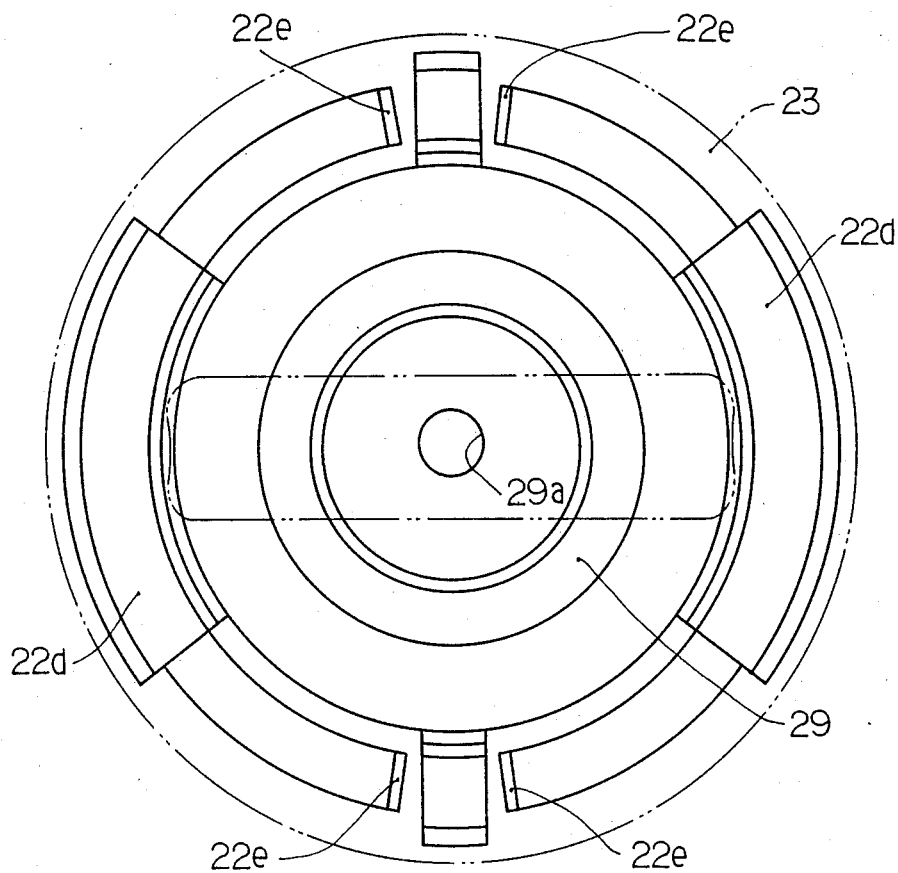

VALVE BODY

BACKGROUND OF THE INVENTION (1) Field of the Invention

The present invention relates to a valve body for use in a cap with a valve, such as a fuel cap or a radiator cap for an automobile.

(2) Description of the Prior Art

A valve body for use in a fuel cap of the type shown in FIGS. 1 to 2 is known (see Japanese Patent Laid-Open No. 116974/1985).

The valve body 7, of FIGS. 1 and 2 made from a rubbery elastic material, such as rubber or thermoplastic elastmer, has a disk-like form. The valve body 7 comprises a securing portion 7a, at the central portion thereof, having a downward-projection 7b whose tip portion expands so as to fit into a securing hole 6a disposed in a valve support plate 6. The valve body 7 further comprises an arm portion 7c which extends outwardly in the radial direction such as to be parallel to the valve body support plate 6 starting from the securing portion 7a, and a lip portion 7d which is disposed at the outer periphery of the arm portion 7c around the entire circumference of the same in such a manner that it projects upward.

The lip portion 7d seals the lower surface of a ceiling portion 2a in such a manner that it seals the area around a flow passage aperture 2b which is bored through the center of the ceiling portion 2a of a main cap body 2, which portion opposes the valve body support plate 6. The lip portion 7d is caused to abut against the circumferential portion of the flow passage aperture 2b by the spring force of a coil spring 5. A lower end portion of the coil spring 5 is held by a spring support plate 4 which is secured, in an undercutting manner, at a lower portion of the inner surface of the main cap body 2. On the other hand, the top end portion of the coil spring 5 is positioned in contact with the lower surface of the valve body support plate 6 so as to give an upward bias to the support plate 6 with the valve body 7.

An annular groove 7e is formed between the securing portion 7a and the outer edge portion of the reverse side of the arm portion 7c around the entire circumference thereof. This annular groove 7e is adapted to form a prescribed gap h between the reverse side of the arm portion 7c and the valve support plate 6 when the lip portion 7d does not abut against the circumferential portion of the fluid passage aperture 2b. This annular groove 7e is so designed that it corresponds to the profile irregularities (in particular, surface smoothness) of the lower circumferential portion of the flow passage aperture 2b of the ceiling portion 2a, the valve body support plate 6, and the lip portion 7d. That is, this annular groove 7e is arranged to absorb any error in surface smoothness existing in any of these portions by being readily deflected in the axial direction of the valve body 7 relative to the supporting point, that is, the portion connecting the arm portion 7c and the securing portion 7a.

Reference numeral 3 represents a top cover which is installed on the top of the main cap body 2. Reference numeral 10 represents a filler neck of a fuel chamber.

The operation of the fuel cap 1 will now be described.

When the pressure inside the fuel chamber drops below a predetermined negative pressure, the valve body 7 with the valve body support plate 6 is lowered against the spring force of the coil spring 5. The lip portion 7d is separated from the lower surface of the ceiling portion 2a around the flow passage aperture 2b in the ceiling portion 2a of the main cap body 2. The separation causes the flow passage aperture 2b to open, whereby air is introduced through the flow passage aperture 2b into the fuel chamber, and the negative pressure state of the fuel chamber inside can thus be restored.

In the conventional valve body 7, the annular groove 7e is formed on the reverse side of the arm portion 7c, starting from the securing portion 7a to the edge of the arm portion 7c, completely around the arm portion 7c. A predetermined gap h is, therefore, formed between the reverse side of the arm portion 7c and the valve body support plate 6, when the lip portion 7d does not abut against the ceiling portion 2a. Therefore, in this valve body 7, the lip portion 7d is capable of being easily deflected in the axial direction of the valve body 7 relative to a supporting point: the portion connecting the arm portion 7c and the securing portion 7a. The deflection of the lip portion 7d is capable of absorbing any errors occuring on the lower surface of the ceiling portion 2a of the main cap body 2 in the circumferential portion of the flow passage aperture 2b, the valve body support plate 6, and the lip portion 7d, even if the accuracy in surface smoothness is insufficient.

In a case where the valve body 7 is operated at a low pressure using a coil spring 5 with a low spring constant, it is not sufficient to absorb the aforementioned errors solely by the provision of a predetermined gap on the reverse side of the arm portion 7c. A precise control of the accuracy of surface smoothness of the lip portion 7d, and its sealing portion, that is, the ceiling portion 2a of the main cap body is necessary.

In the conventional valve body 7, the annular lip portion 7d is projected around the entire outer circumference of the top surface thereof The thickness of the portion at which the lip portion 7d is formed is, of course, greater than that of the portion adjacent to and continued from the lip portion 7d.

A rubbery elastic material flows in a mold cavity from the securing portion 7a toward the lip portion 7d in the case, for example, where a gate is provided beneath the projection 7b at the center of the valve body 7 when the latter is formed. Therefore, if the thickness of the lip portion 7d is great, the pressure available for pressing the rubbery elastic material rapidly decreases in the lip portion 7d. There is a risk that undesired air pockets may be formed in the lip portion 7d. If such air pockets are generated, it is impossible for a top portion 7t of the lip portion 7d, which top portion abuts against the portion to be sealed, to keep the profile irregularity (smoothness: substantially $\pm 5$ $\mu$m) which is necessary from the viewpoint of sensitivity in opening the valve and retention of sealing capability. Valves which include such air pockets form defective products.

SUMMARY OF THE INVENTION

An object of the invention is to provide a valve body which is capable of overcoming the aforementioned problems by virtue of its capacity to absorb a greater degree of error in surface smoothness. As a result of this, precision control of the lip portion and sealing portion of the valve body can be readily performed. Furthermore, a low pressure operation of the valve body can be readily performed.

The aforementioned object can be achieved by a valve body made of a rubbery elastic material and comprising a securing portion which is secured by a securing member, an arm portion which is positioned at a predetermined distance from the securing member and which is extended substantially parallel to the securing member starting from the securing portion, a lip portion which projects from the tip portion of the arm portion and which abuts against the portion to be sealed, which portion opposes the securing member, and a thin portion created by forming an annular recess in the arm portion adjacent to the lip portion.

As a result of the arrangement having the aforementioned configuration, the valve body according to the present invention is positioned with respect to the securing member in such a manner that a predetermined gap can be maintained between the arm portion and the securing member. The valve body has a thin portion in the arm portion thereof adjacent to the lip portion thereof. Due to the provision of this thin portion, the lip portion is deflected relative to two supporting points when the lip portion abuts against the portion to be sealed: the portion connecting the arm portion and the securing portion; and the thin portion. That is, in the valve body according to the present invention, a thin portion is additionally provided as a point for supporting the deflection of the lip portion, this being in contrast to the conventional valve body. As a result of this, it is able to absorb errors in the precision of the surface smoothness of the lip portion and the sealing portion to a greater extent.

Therefore, the valve body according to the present invention can absorb errors in accuracy of surface smoothness to a greater extent than the conventional valve body. Consequently, control of the precision of the lip portion and its sealing portion can be conducted easily, and the low pressure operation is realized in this valve body.

A further object of the present invention is to provide a valve body in which the generation of air pockets in the lip portion is prevented when the valve body is formed. Therefore, the profile irregularity which is needed for the tip portion of the lip portion can be readily obtained, which is helpful as a way of reducing the rate of defective products produced.

The aforementioned object can be achieved by a valve body made from a rubbery elastic material comprising a securing portion which is secured by a securing member, a lip portion which extends and projects from the securing portion and which abuts against the portion to be sealed, which portion opposes the securing member, and an annular thinning recess which is formed in the base of the lip portion at the end opposite to the tip portion thereof.

The thickness of the lip portion of the valve body according to the present invention is smaller than that of the lip portion of the conventional valve body. The thin thickness portion of the valve body according to the present invention is achieved by adopting the configuration mentioned above in which an annular thinning recess is formed in the base of the annular lip portion at the end opposite to the tip portion thereof.

Therefore, rapid reduction of the pressure at which a rubbery elastic material is charged into a mold cavity when the valve body is formed is prevented. As a result of this, the formation of air pockets in the lip portion can be prevented. Consequently, the profile irregularity which is needed for the tip portion of the lip portion can be easily obtained, which will be helpful as a way of reducing the rate of defective products produced.

BRIEF DESCRIPTION OF THE DRAWINGS

FIG. 7 is a sectional view of a valve body as the second embodiment;

FIG. 8 is a plan view illustrating a state wherein a top cover of a fuel cap with a valve body as the second embodiment is removed;

DESCRIPTION OF THE PREFERRED EMBODIMENTS

Referring to the accompanying drawings, preferred embodiments will now be described. Parts which are the same as those of the conventional valve body are given the same numerals.

Figure 1:
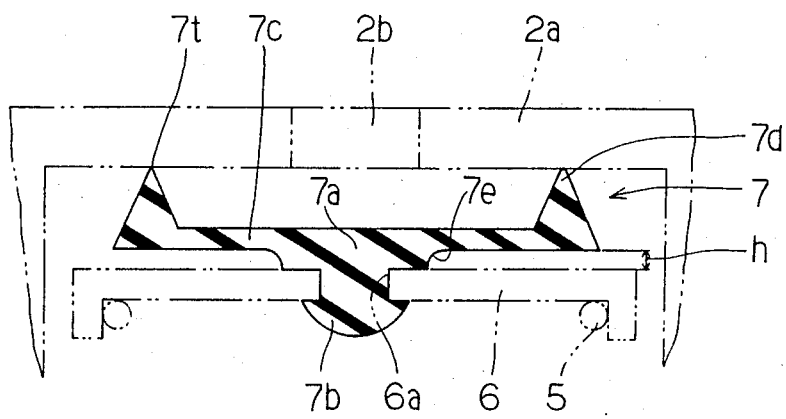
FIG. 1 is a view of a conventional valve body.
Figure 2:
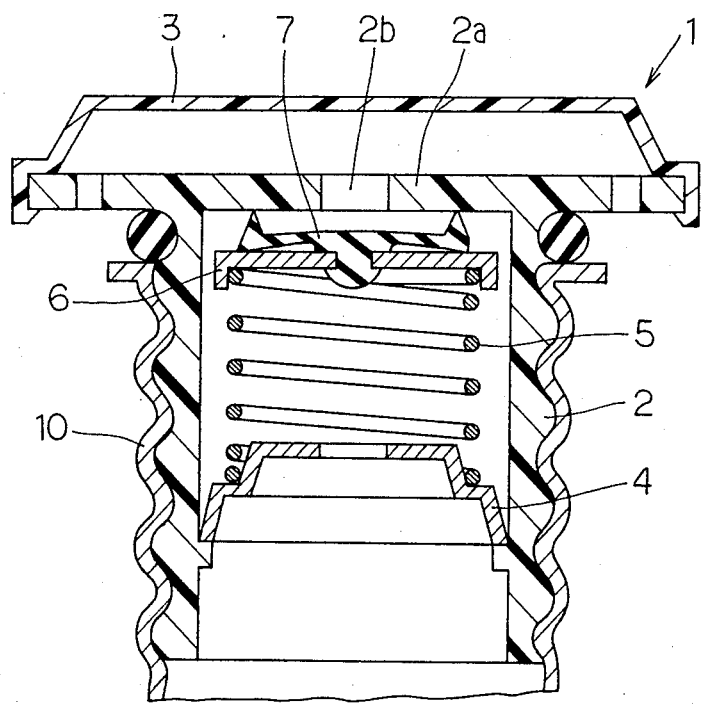
FIG. 2 is a sectional view of a fuel cap with a conventional valve body.
Figure 3:
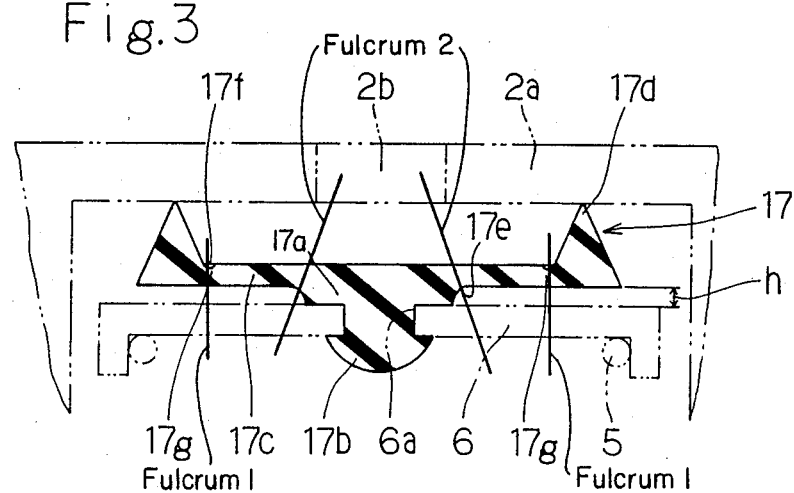
FIG. 3 is a sectional view of a valve body as a first embodiment of the invention.
Figure 4:
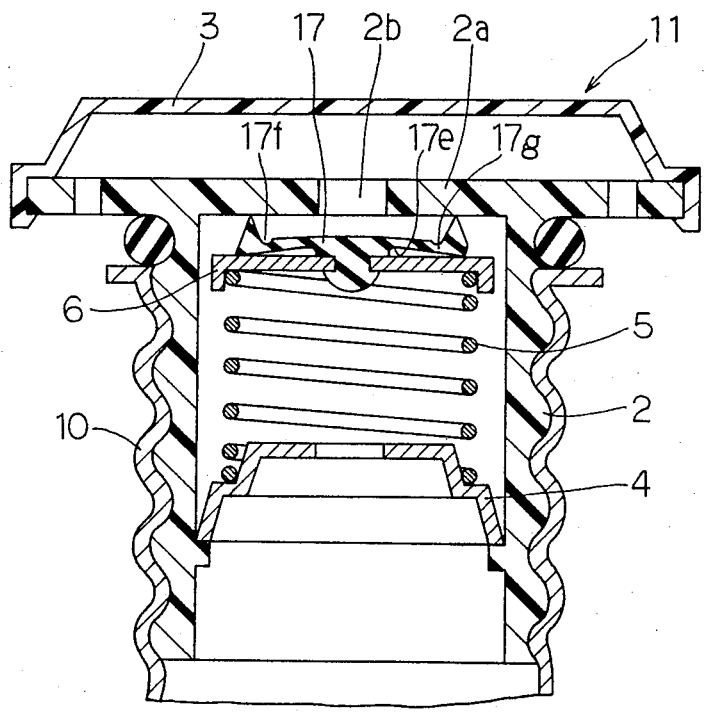
FIG. 4 is a sectional view of a fuel cap with a valve body as the first embodiment.

A valve body 17 of a first embodiment shown in FIGS. 3 and 4 which is to be fitted in a conventional fuel cap 11 is made of a rubbery elastic material such as rubber or a thermoplastic elastomer in disk-like form. The valve body 17 comprises a securing portion 17a, which has a projection 17b at the center portion thereof. The projection 17b has a disk-like form and projects downwardly with an expanded tip which allows it to be secured in a securing hole 6a disposed in a valve body support plate 6. The valve body 17 further comprises an arm portion 17c which extends radially from the securing portion 17a toward the outside in parallel with the valve body support plate 6. The valve body 17 further comprises an annular lip portion 17d. The annular lip portion 17d projects upwardly at the outer periphery of the arm portion 17c around the entire circumference of the same as to seal the area around a flow passage aperture 2b bored in the lower surface of a ceiling portion 2a, which portion opposes the valve body support plate 6 of the main cap body 2. The valve body 17 further comprises an annular groove 17e in the lower surface of the arm portion 17c. The annular groove 17e extends from the securing portion 17a to the outer edge of the arm portion 17c. This annular groove 17e is provided for the purpose of forming a predetermined gap h between the arm portion 17c and the valve body support plate 6 when the valve body is secured to the valve body support plate 6 through the securing portion 17a.

The valve body 17 has an annular recess 17f formed around the edge of the lip portion 17d which is disposed on the upper surface of the arm portion 17c. The annular recess 17f creates an annular thin portion 17g around the entire circumference of the lip portion 17d of the arm portion 17c adjacent to the same.

Description will now be given of the usual operation that takes place when the valve body 17 of the first embodiment is installed and held by the valve body support plate 6 through the securing portion 17a, and is then installed in the main cap body 2 with a coil spring 5 and a spring support plate 4, the thus assembled fuel cap 11 then being installed in a filler neck 10 of a fuel chamber.

The lip portion 17d of the valve body 17 is caused to abut against the portion to be sealed by the force of the coil spring 5: namely the portion around the flow passage aperture 2b in the lower surface of the ceiling portion 2b of the main cap body 2. In this way, the lip portion 17d closes the flow passage aperture 2b. When this lip portion 17d thus seals the portion to be sealed, the lip portion 17d of the arm portion 17c - is deflected relative to two supporting points: the portion connecting the arm portion 17c and the securing portion 17a and the thin portion 17g of the arm portion 17c. As a result of this, errors in the precision of surface smoothness of the lip portion 17d and the ceiling portion 2a of the main cap body 2 to be sealed by the lip portion 17d can be easily absorbed.

When the pressure inside the fuel chamber drops below a predetermined negative pressure, the valve body 7 with the valve body support plate 6 is lowered against the spring force of the coil spring 5. The lip portion 17d is then separated from the circumferential portion of the flow passage aperture 2b bored in the lower surface of the ceiling portion 2a of the main cap body 2. The flow passage aperture 2b is thus opened. As a result of this, air is introduced into the fuel chamber through the flow passage aperture 2b, whereby the negative pressure state in the fuel chamber is restored.

Figure 5:
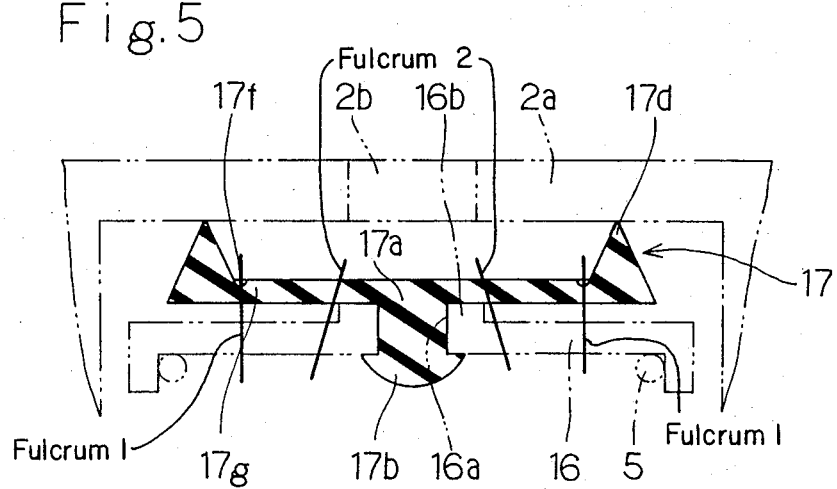
FIG. 5 is a sectional view illustrating another example of the first embodiment.

The valve body 17 of the first embodiment provided with the annular groove 17e in the lower surface of the arm portion 17c and extends from the securing portion 17a to the outer edge of the arm portion 17c over the entire surface thereof is shown. The annular groove 17e is provided for the purpose of ensuring the gap h between the arm portion 17c and the valve body support plate 6. However, as shown in FIG. 5, in a case where the valve support plate 16 includes a projection 16b which projects upwardly around the edge portion of the securing hole 16a into which the projection 17b of the valve body 17 is inserted, the predetermined gap h can be ensured between the arm portion 17c and the valve body support plate 16 without any necessity to provide the annular groove 17e. The valve body 17 in this case may be constituted as described before.

Figure 6:
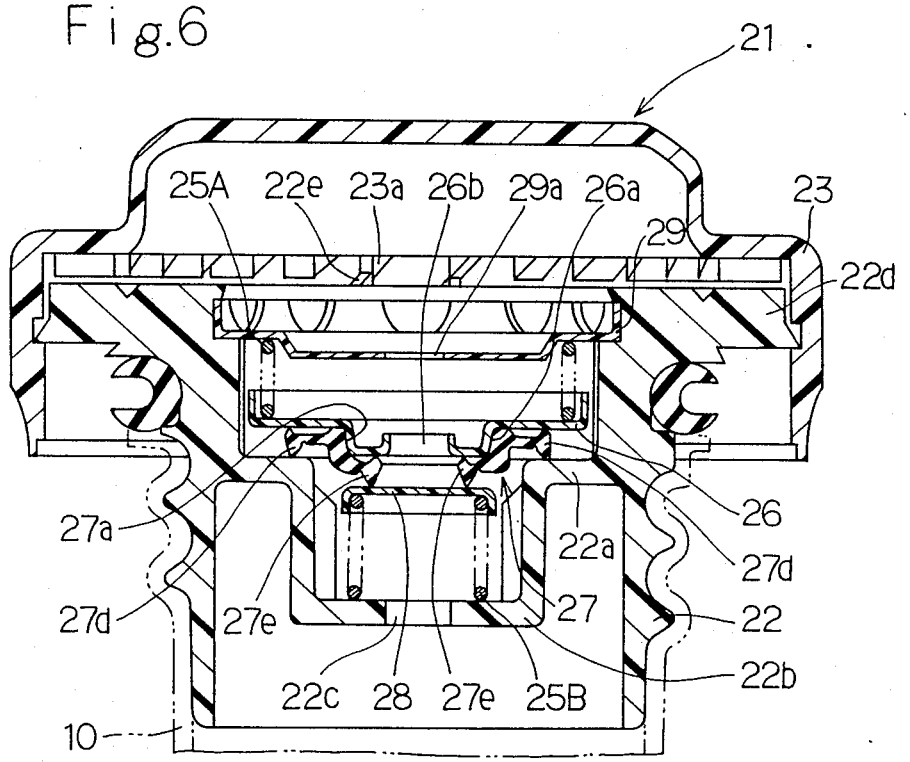
FIG. 6 is a sectional view of a fuel cap with a valve body as a second embodiment.

Although the valve body 17 which is adapted to be operated when the pressure is negative is described in the first embodiment, this invention can be applied to a valve body 27 of a second embodiment, shown in FIGS. 6 and 7, which is adapted to be operated when the pressure is either positive or negative.

The valve body 27 of the second embodiment made of a material similar to that of the valve body 17 of the first embodiment is formed in a substantially annular shape. This valve body 27 comprises a cylindrical securing portion 27a having a thick wall which extends vertically, arm portions 27b and 27c which respectively extend outwardly and inwardly, in the radial direction, extending respectively from the top end and the lower end of the securing portion 27a. The valve body 27 further comprises an outer circumferential lip portion 27d and an inner circumferential lip portion 27e at the edges of the arm portions 27b and 27c, respectively. Both the outer circumferential lip portion 27d and the inner circumferential lip portion 27e project downward and extend starting from the corresponding arm portions 27b and 27c.

The valve body 27 is installed in and secured by the valve body support plate 26 by way of fitting the securing portion 27a thereof into the step portion 26a of the valve body support plate 26 which has a disc like form.

In order to ensure predetermined gaps h between the arm portions 27b and 27c of the valve body 27 and the valve body support plate 26, annular grooves 27f and 27g are formed around in the outer circumferential portion and the inner circumferential portion of the securing portion 27a, respectively. Annular recesses 27h and 27i are formed adjacent to the lip portions 27d and 27e of the corresponding arm portions 27b and 27c which are disposed at each of the tips thereof. As a result of this, annular thin portions 27j and 27k are formed.

The portion to be sealed by the outer circumferential lip portion 27d of the valve body 27 is a step portion 22a which is projectingly provided on the inner surface of the main cap body 22. On the other hand, the portion to be sealed by the inner circumferential lip portion 27e is a valve plate 28 which is upwardly biased from the spring seating portion 22b disposed beneath the step portion 22a by means of a coil spring 25B.

A fuel cap 21 can be formed by installing and securing the valve body 27 to the valve body support plate 26, and sequentially installing, in the main cap body 22, this valve body support plate 26 to which the coil spring 25B, the valve plate 28, and the valve body 27 are fitted, and a coil spring 25A and a spring seating plate 29. Since annular thin portions 27j and 27k formed adjacent to the lip portions 27d and 27e of the arm portions 27b and 27c, respectively, are provided in the valve body 27 when this fuel cap 21 is installed and put into use in the prescribed filler neck 10, the operation similar to that shown in the first embodiment can be performed.

The operations of the fuel cap 21 in the positive pressure state and the negative pressure state will now be described. When the pressure inside the fuel chamber is positive, the valve body support plate 26 rises with the valve body 27 against the spring force from the coil spring 25A. Then, the outer circumferential lip portion 27d of the valve body 27 is separated from the step portion 22a of the main cap body 22, whereby a gap is formed at the position where the outer circumferential lip portion 27d separates from the step portion 22a of the main cap body 22. As a result of the forming of this gap, fluid such as air or the like in the fuel chamber is delivered to the outside through a flow passage aperture 22c in the spring seating 22b, a flow passage aperture 29a of the spring seating plate 29, and between an elastic finger 22e which is formed on a flange portion 22d disposed on the upper portion of the main cap body 22 and a top cover 23 (see FIG. 8). Consequently, the positive pressure in the fuel chamber can be eliminated. The elastic finger 22e cooperates with a plurality of projections 23a which are projectingly provided on the lower surface of the top cover 23 in restricting the amount of torques which may be applied to the fuel cap 21 in tightening.

When the pressure inside the fuel chamber is negative, the valve plate 28 is lowered against the spring force of the coil spring 25B. Then, the inner circumferential lip portion 27e of the valve body 27 separates from the valve plate 28, whereby the gap is formed in the space between the lip portion 27e and the valve plate 28. Consequently, fluid such as air or the like is introduced into the fuel chamber between the elastic finger 22e and the top cover 23, and through the fluid passage aperture 29a of the spring seating plate 29 and a fluid passage aperture 26b of the valve body support plate 26, whereby the negative pressure inside the fuel chamber can be eliminated.

A valve body 37 of a third embodiment, shown in FIG. 9 and 10, will now be described.

The valve body 37 made from the material similar to that of the valve body 17 of the first embodiment is formed in a substantially umbrella-like shape. The valve body 37 is held by a ceiling portion 32a of a main cap body 32.

The valve body 37 comprises a securing portion 37a having a flow passage aperture 37b formed at the center thereof. The securing portion 37a - is fitted into a projecting securing hole 32b which is disposed at the center of the ceiling portion 32a. The valve body 37 further comprises an arm portion 37c which extends diagonally downward from the securing portion 37a. The valve body 37 further comprises a lip portion 37d which projects inwardly, and which is positioned around the tip portion of the arm portion 37c.

This lip portion 37d is adapted to seal a valve plate 38 which is disposed facing the ceiling portion 32a - of the main cap body 32, the ceiling portion 32a holding the valve body 37 in place. The valve plate 38 projects upward and is formed in a semi-spherical shape. This valve plate 38 is biased upward by the spring force of a coil spring 35. The lower end portion of the coil spring 35 is held by a spring support plate 34 which is secured in an undercutting manner by a plurality of ribs 32c which project from the inner surface of the main cap body 32.

An annular recess 37f is disposed adjacent to the lip portion 37d in the arm portion 37c, whereby a thin portion 37g is created.

Therefore, in the valve body 37, the arm portion 37c extends diagonally downward from the securing portion 37a.

Consequently, a gap h which is capable of allowing the lip portion 37d of the arm portion 37c to be deflected between the arm portion 37c and the ceiling portion 32a is formed after the valve body 37 is fixed to the ceiling portion 32a of the main cap body 32. An annular thin portion 37g is formed along the lip portion 37d, whereby an operation similar to that described in the first embodiment can be obtained. The valve body 37 may be constituted in the manner described above.

The operation of a fuel cap 31 of the third embodiment will now be described.

When the pressure inside the fuel chamber drops below a predetermined level, the valve plate 38 is lowered against the spring force of the coil spring 35. The valve plate 38 separates from the lip portion 37d of the valve body 37. Thus, the flow passage aperture 37b of the valve body 37 is opened, whereby the negative pressure state inside the fuel chamber can be eliminated via flow passage aperture 37b.

In order to form the thin portions 17g, 27j, 27k and 37g of the valve bodies 17, 27 and 37 of the first to third embodiments, the recesses 17f, 27h, 27j and 37f are disposed on the surfaces of the arm portions 17c, 27b, 27c and 37c from which the lip portions 17d, 27d, 27e and 37d respectively project. However, these annular recesses may, of course, be, provided on the other sides of the arm portions 17c, 27b, 27c, and 37c. Alternatively, the annular recesses may, of course, be provided on both sides.

Figure 11:
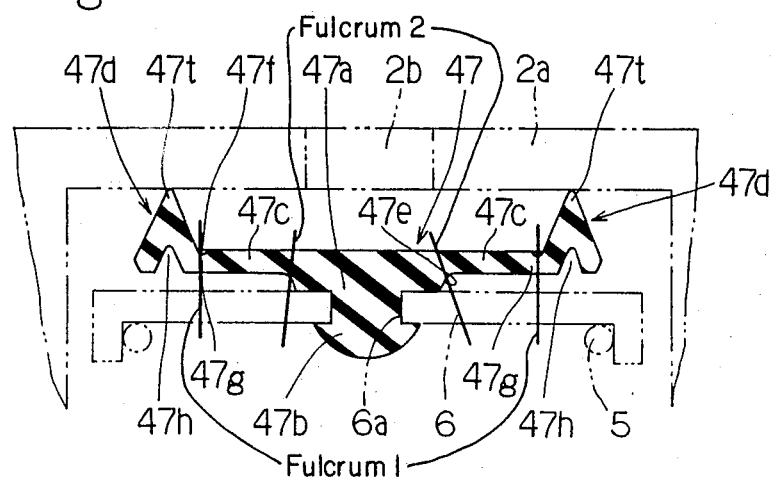
FIG. 11 is a sectional view of a valve body as a fourth embodiment.
Figure 12:
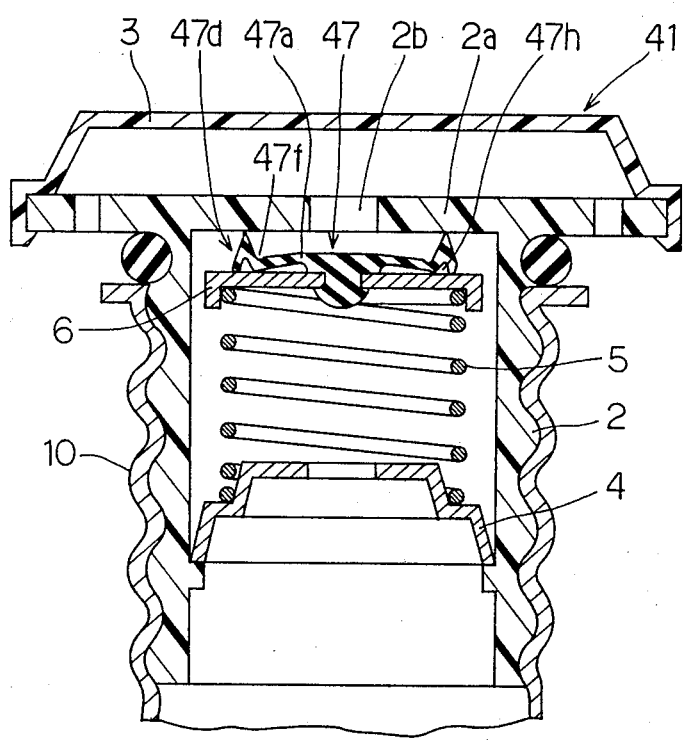
FIG. 12 is a sectional view of a fuel cap with a valve body as the fourth embodiment.

A valve body 47 of a fourth embodiment shown in FIGS. 11 and 12 will now be described.

The valve body 47 is made of a similar material as that of the valve body 17 of the first embodiment, and is formed in a disc-like shape. The valve body 47 comprises, in the similar manner to that of the valve body 17, a securing portion 47a, a projection 47b, an arm portion 47c, a lip portion 47d, an annular groove 47e, an annular recess 47f, and an annular thin portion 47g.

In the valve body 47, a thinning recess 47h is formed around in the base of the annular lip portion 47d in the lower surface of the arm portion 47c which is the opposite side of the tip portion 47t of the lip portion 47d, that is, immediately below the tip portion 47t. The cross-sectional shape of the thinning recess 47h is substantially similar to that of the lip portion 47d (substantially triangular configuration). In the forth embodiment, the thinning recess 47h is so formed that the thickness of the lip portion 47d is substantially the same as that of the portion which is continued from the lip portion 47d, that is the arm portion 47c.

The pressure for charging rubbery elastic material into the mold cavity can be kept substantially uniform without any rapid drop when the valve body 47 of the fourth embodiment is formed in the similar manner to that of the conventional valve body in which material is fed from the securing portion 47a to the lip portion 47d. The air pockets can be therefore prevented from being formed. The profile irregularity (surface smoothness: substantially ±5 μm) of the tip portion 47t of the lip portion 47d which is necessary from the viewpoints of valve opening sensitivity and retentions of sealing capability can be readily obtained. Consequently, the rate of defective valve bodies 47 produced can be reduced, whereby costs can be kept low.

The operation of a fuel cap with the valve body 47 is the same as that of the fuel cap 11 shown in FIG. 4.

Figure 13:
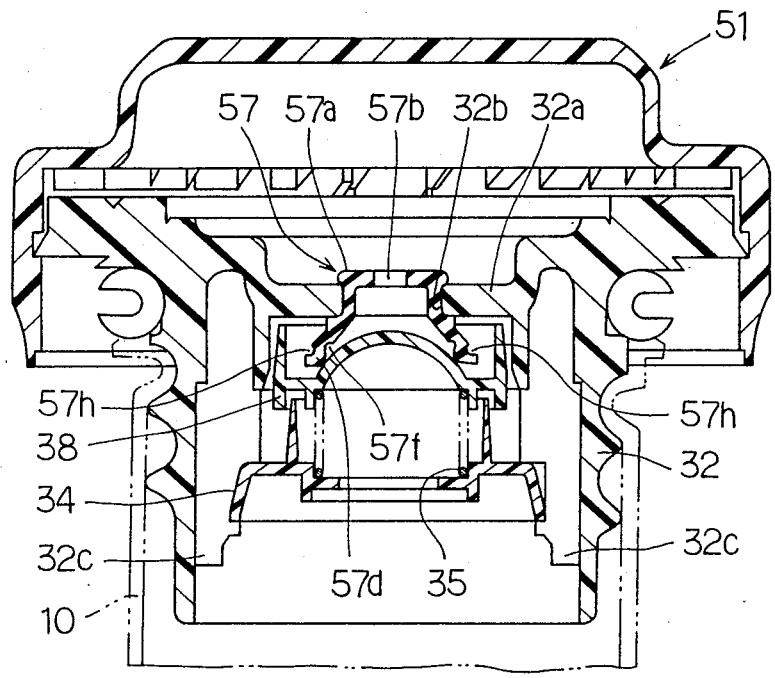
FIG. 13 is a sectional view of a fuel cap with a valve body as a fifth embodiment.
Figure 14:
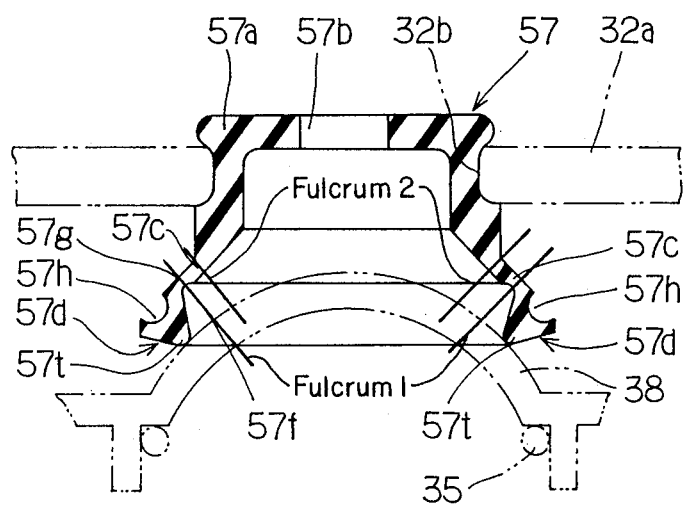
FIG. 14 is a sectional view of a valve body as the fifth embodiment.

The valve body 57 may be constituted as shown in FIGS. 13 and 14.

The valve body 57 made of a similar material as that of the valve body 37 of the third embodiment is formed in a substantially similar shape to that of the same. The valve body 57 comprises a securing portion 57a, a flowing passage aperture 57b, an arm portion 57c, a lip portion 57d, an annular recess 57f, and an annular thin portion 57g.

In the valve body 57, an annular thinning recess 57h having a semicircular cross sectional shape is formed in the upper surface of the valve body 57. This upper surface is the other side of the side at which a tip portion 57t of the lip portion 57d is formed. The annular thinning recess 57h is disposed in the base of the annular lip portion 57d which is formed in a substantially triangular configuration. The thickness of the lip portion 57d is so arranged that it is substantially same as that of the portion which is continued from the lip portion 57d, that is the arm portion 57c. As a result of which, the forming of air pockets in the lip portion 57d can be prevented when the valve body 57 is formed, which is the similar effect as that obtained by the valve body 47 of the fourth embodiment.

Figure 9:
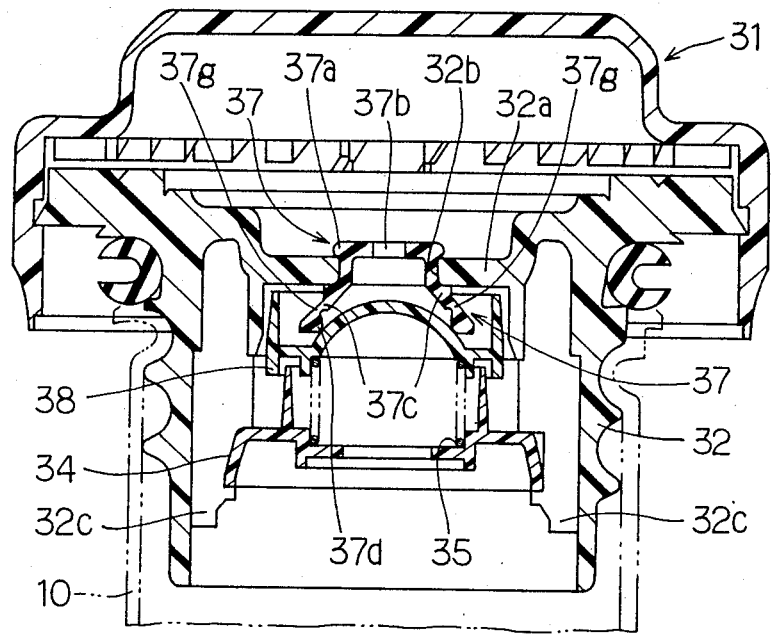
FIG. 9 is a sectional view of a fuel cap with a valve body as a third embodiment.
Figure 10:
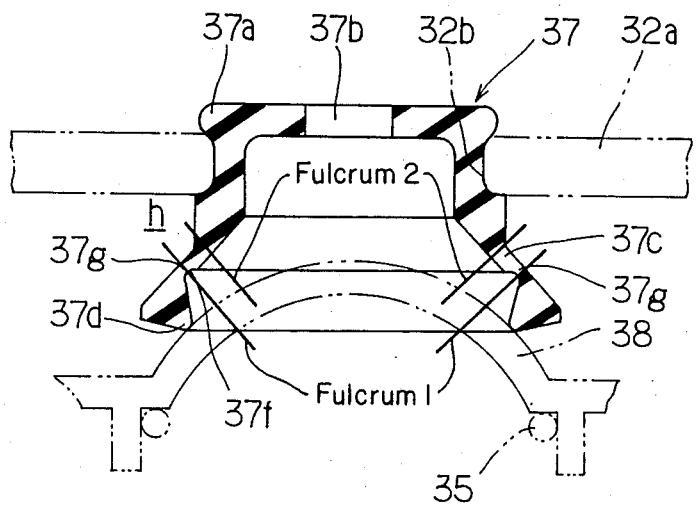
FIG. 10 is a sectional view of a valve body as the third embodiment.

The operation of a fuel cap 51 with the valve body 57 is the same as that of the fuel cap 31 shown in FIG. 9.

Figure 15:
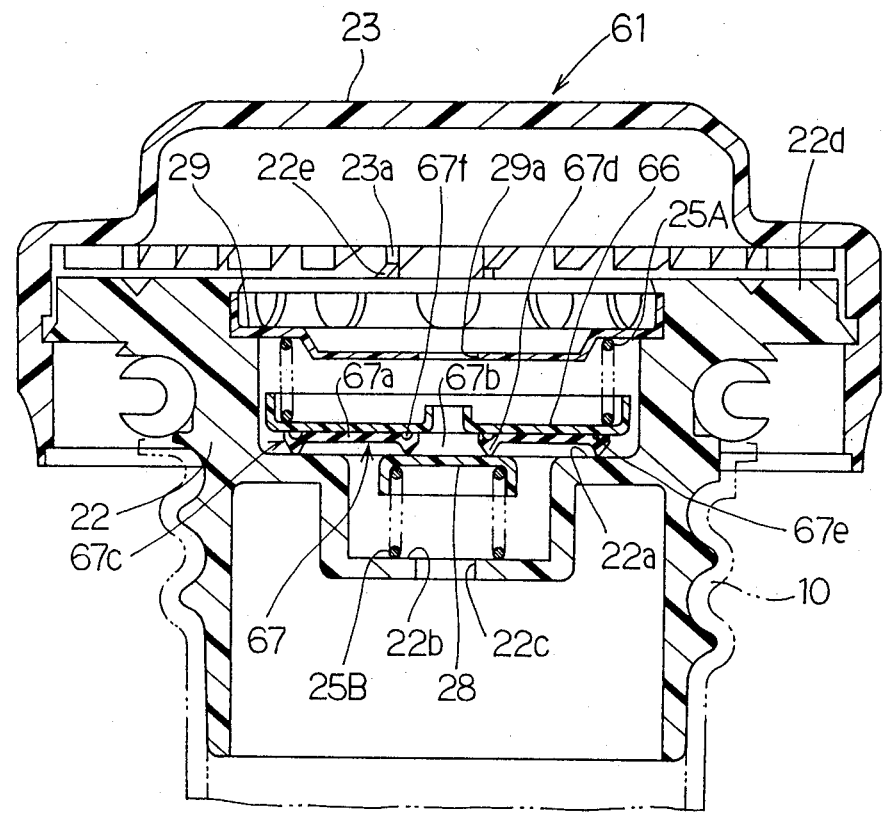
FIG. 15 is a sectional view of a fuel cap with a valve body as a sixth embodiment.
Figure 16:
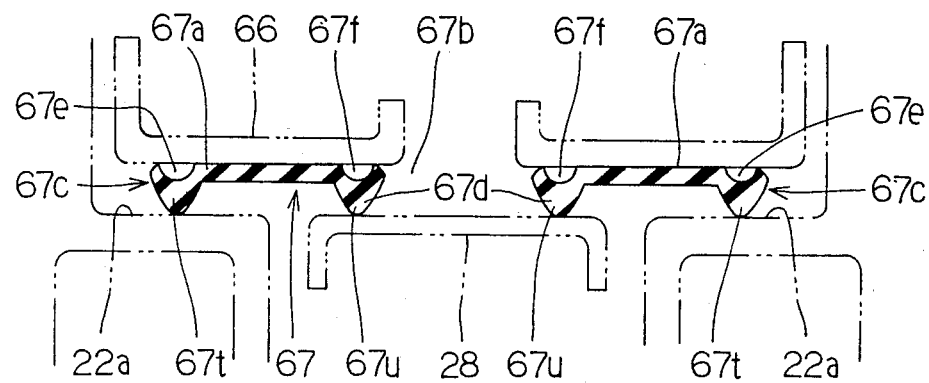
FIG. 16 is a sectional view of a valve body as the sixth embodiment.

A valve body 67 of a sixth embodiment constituted as shown in FIGS. 15 and 16 may be employed.

The valve body 67 is made of a rubbery elastic material such as rubber or thermoplastic elastmer, and formed in an substantially circular shape. The valve body 67 comprises a flow passage aperture 67b at the central portion thereof. The valve body 67 further comprises an outer circumferential lip portion 67c and an inner circumferential lip portion 67d which project downward starting from the outer edge and the inner edge of the valve body 67, respectively, both of which being formed in a substantially triangular configuration. The securing portion 67a is provided between the outer circumferential lip portion 67c and the inner circumferential lip portion 67d. The valve body 67 is stuck with adhesive to a valve support plate 66 which is the valve support plate 26 shown in FIGS. 6 and 7 from which the step 26a is omitted.

The portion to be sealed by the outer circumferential lip portion 67c is the step portion 22a which is disposed on the inner circumferential surface of the main cap body 22. The portion to be sealed by the inner circumferential lip portion 67d is the valve plate 28 which is upwardly biased from the spring seating 22b which is disposed below the step 22a through the coil spring 25B.

In the valve body 67, annular thinning recesses 67e and 67f having a substantially semicircular cross sectional shape are formed in the base of lip portions 67c and 67d, respectively. The annular thinning recesses 67e and 67f are disposed at the end opposite to the tip portions 67t and 67u of the outer circumferential lip portions 67c and the inner circumferential lip portions 67d. The thickness of the lip portions 67c and 67d is, therefore, substantially the same as that of the securing portion 67a which is continued to the lip portions 67c and 67d. Therefore, a rapid drop of the pressure for charging the forming material occuring in the lip portions 67c and 67d can be prevented when the valve body 67 is formed. Consequently the forming of air pockets occuring in the lip portions 67c and 67d can be prevented.

The operation of the fuel cap with the valve body 67 is the same as that of the fuel cap 21 shown in FIG. 6.

The thinning recess in the lip portion may be provided in the lip portions of the valve body 17 shown in FIG. 5, or in the same regions of the valve body 27.

What is claimed is:

1. A valve body made of a rubbery elastic material comprising.
   (a) a securing portion which is held by a securing member;
   (b) an arm portion which extends substantially parallel to said securing member, starting from said securing portion, and which ensures that a predetermined gap is provided between said arm portion and said securing member;
   (c) a lip portion which projects from a tip portion of said arm portion remote from said securing portion, on one side of said valve body, and which abuts against a portion to be sealed, which portion opposes said securing member;
   (d) a thin portion constituted by provision of an annular recess in said arm portion adjacent to said lip portion, thereby providing a first annular fulcrum for facilitating deflection of said lip portion relative to said securing portion; and
   (e) means providing a second annular fulcrum in said arm portion and disposed in one of surrounding and surrounded relation to said first fulcrum for additionally facilitating deflection of said lip portion relative to said securing portion.

2. A valve body according to claim 1 wherein said annular recess forming said thin portion is formed in a surface on the same side of said valve body as the side from which said lip portion projects.

3. A valve body made of a rubbery elastic material comprising:
   (a) a securing portion which is held by a securing member;
   (b) an annular lip portion which projects axially in one direction from one side of the valve body;
   (c) connecting means connecting at one end thereof with said securing portion and connecting remotely of said one end with said lip portion;
   (d) the lip portion having a tip abutting against a portion to be sealed, which portion to be sealed opposes said securing member, and an axially oppositely-directed base;
   (e) an annular recess formed in said base;
   (f) means providing a first annular fulcrum in said connecting means for facilitating deflection of said lip portion relative to said securing portion; and
   (g) means providing a second annular fulcrum in said connecting portion and disposed in one of surrounding and surrounded relation to said first fulcrum for additionally facilitating deflection of said lip portion relative to said securing portion.

4. A valve body according to claim 3, wherein:
the lip portion is of generally V-shaped longitudinal cross-sectional profile.

5. A valve body according to claim 3, wherein:
said recess is of substantially V-shaped longitudinal cross-sectional profile.

6. A valve body according to claim 3, wherein:
said recess is of substantially U-shaped longitudinal cross-sectional profile.

* * * * *